(12) United States Patent
Leung et al.

(10) Patent No.: US 11,739,592 B2
(45) Date of Patent: Aug. 29, 2023

(54) DOWNHOLE MOTOR OR PUMP WITH STATOR MANUFACTURED WITH COLD SPRAY

(71) Applicant: Halliburton Energy Services, Inc., Houston, TX (US)

(72) Inventors: Philip Park Hung Leung, Houston, TX (US); Krutibas Panda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 17/537,733

(22) Filed: Nov. 30, 2021

(65) Prior Publication Data

US 2023/0167686 A1    Jun. 1, 2023

(51) Int. Cl.
| | |
|---|---|
| *E21B 4/02* | (2006.01) |
| *B05D 1/02* | (2006.01) |
| *C10M 109/00* | (2006.01) |
| *C09K 5/14* | (2006.01) |
| *C10N 50/08* | (2006.01) |

(52) U.S. Cl.
CPC ............... *E21B 4/02* (2013.01); *B05D 1/02* (2013.01); *C09K 5/14* (2013.01); *C10M 109/00* (2013.01); *C10N 2050/08* (2013.01)

(58) Field of Classification Search
CPC ........................................................ E21B 4/02
See application file for complete search history.

(56) References Cited

U.S. PATENT DOCUMENTS

| | | | |
|---|---|---|---|
| 7,402,277 B2 | 7/2008 | Ayer et al. | |
| 2010/0038142 A1 | 2/2010 | Snyder et al. | |
| 2011/0044697 A1* | 2/2011 | Peter | H04B 10/801 |
| | | | 359/341.1 |
| 2011/0203110 A1 | 8/2011 | Hooper et al. | |
| 2011/0220348 A1* | 9/2011 | Jin | E21B 17/1085 |
| | | | 166/244.1 |
| 2013/0052067 A1 | 2/2013 | Hohl et al. | |
| 2014/0054091 A1* | 2/2014 | Barnard | F04C 2/1073 |
| | | | 175/107 |
| 2015/0316052 A1 | 11/2015 | Taylor et al. | |
| 2017/0167199 A1* | 6/2017 | Blake | E21B 4/02 |
| 2020/0378195 A1 | 12/2020 | Leung | |
| 2021/0172251 A1 | 6/2021 | Leung et al. | |
| 2021/0310326 A1* | 10/2021 | Althowiqeb | E21B 31/035 |
| 2021/0310333 A1 | 10/2021 | Althowiqeb | |

OTHER PUBLICATIONS

International Search Report and Written Opinion dated Jan. 27, 2023 for PCT Patent Application No. PCT/US2022/078201 filed on Oct. 17, 2022.

(Continued)

*Primary Examiner* — Giovanna Wright
(74) *Attorney, Agent, or Firm* — K&L Gates LLP

(57) ABSTRACT

A downhole motor or pump assembly that includes a stator and a rotor rotatable within the stator. The stator includes a tubular housing and an overlay deposited by cold spray onto an interior of the housing to form overlay lobes along a first length of the stator. The downhole motor or pump may be used to perform downhole operations.

22 Claims, 10 Drawing Sheets

(56) References Cited

OTHER PUBLICATIONS

Hall, Aaron, Deposition Behavior in Cold Sprayed Copper-Tungsten Metal Matrix Composites, Sandia National Laboratories, Feb. 2014, 456-462, Albuquerque, NM.
Abaco Drilling Technologies, Eventek Stators create more power and cost less per foot than conventional power sections, Dec. 15, 2020, 1 page.
Widener, C.A., Application of High-Pressure Cold Spray for an Internal Bore Repair of a Navy Valve Actuator, Journal of Thermal Spray Technology, vol. 25(1-2), Jan. 2016, pp. 193-201.
Duratorque, High Performance Power Sections, The advantages of even layer rubber design with the flexibility of a conventional stator, Duratorque Even Power Sections, 4 pages.
Aggarwal, Gaurav, Development of Self-Lubricating Coatings via Cold Spray, Process: Feedstock Formulation and Deformation Modeling, The Pennsylvania State University, Aug. 2007, 182, 2007.
National Oilwell Varco, Step Change Increase in Power, Technical Summary, ERT Power Sections, 1 page.
Pathak, Sunil, Development of Sustainable Cold Spray Coatings and 3D Additive Manufacturing Components for Repair/Manufacturing Applications; a critical review, Coatings 2017, 7, 122; doi:10.3390/coatings7080122, Aug. 14, 2017, pp. 1-27.

\* cited by examiner

DOWNHOLE MOTOR OR PUMP WITH STATOR MANUFACTURED WITH COLD SPRAY

BACKGROUND

Positive Displacement Motors (PDMs), also known as Moineau-type motors, and Progressive Cavity Pumps (PCPs) include a rotor that rotates within an elastomer helicoid stator and can be used in borehole drilling applications. The helicoid shaped stator is made with an elastomer compound that is bonded within a metal housing. Pressurized drilling fluid (e.g., drilling mud) is driven into the motor and into a cavity between the rotor and the stator, which generates rotation of the rotor and a resulting torque is produced. The resulting torque is used to drive a working tool, such as a drill bit, to cut material such as when drilling a borehole. A PCP operates similarly to a PDM, but in reverse where the rotor is driven and fluid is pumped out of the PCP by the rotation of the rotor.

To form a stator in a metal housing for PDM and PCP stators, an adhesive system is first applied by brushing or spraying a solvent- or water-based primer and/or adhesive onto inner surface of the metal housing tube after grit-blasting and cleaning the metal surface to be bonded. To form the stator, an elastomer is injected and molded inside the adhesive applied-metal tubular housing so as to form lobes for interacting with the rotor to impart rotation. The elastomer may be formed as a variable wall with different thickness around the interior of the housing to form the lobes. Alternatively, the stator may be an evenwall stator, where the lobe contours are formed in the interior of the housing and the elastomer is applied with an even thickness around the interior of the housing to form the lobes.

During use, the elastomer acts to seal against the rotor and is compressed. As the rotor rotates, the elastomer then expands back to its original shape after compression. The elastomer can also expand and contract due to changes in operating temperature as well as absorb moisture and chemicals from the mud. The cyclic compression of the elastomer can result in damage due to internal hysteresis heating. Common methods to address this is to use harder elastomers which not only compress less under high loads but can also exhibit reduced hysteresis. Other methods include the use of the evenwall stator. The equal thickness (and reduced thickness) of the elastomer reduces hysteretic heating and the support of the metal improves sealing performance which can be used to improve performance (by reducing elastomer deflection under high pressures and loads).

Manufacturing the contour for the evenwall stator tube is complex due to the length of the stators and the complexity of the contour shape. Some methods include electrochemical etching, EDM methods and welding indexed plates that have the contour cut into the ID of the plates to generate the profile. All these methods are time consuming and expensive. The selection of materials is also limited to the same material as the stator tube.

it is sometimes also desirable to facilitate an electrical connection across the PDM or PCP to connect components above and below the PDM or PCP. The challenge is the nutating motion of the rotor typically does not allow the use of traditional connectors and wiring as the motion of the rotor would induce strain on the connectors. One option is to run wiring through the stator but doing so is challenging in conventional stators due to the relatively thin wall thickness of the stator tube and the typical requirement to ensure that the elastomer can be easily replaced when damaged or worn without affecting the electrical connection.

Therefore, it is desired for a PDM or PCP to include ease of manufacture while properly supporting operation of the rotation of the rotor while increasing reliability and decreasing failure.

BRIEF DESCRIPTION OF THE DRAWINGS

Embodiments of the downhole motor or pump with stator manufactured with cold spray are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes an assembly with a downhole motor or pump with a stator manufactured with cold spraying. Specifically, the stator includes an outer housing and a metallic overlay deposited by cold spray onto an interior of the housing to form overlay contours internal to the housing along a first length of the stator. Rotatable within the stator is a rotor, rotation of which either powers the rotation of a drill bit in the case where the stator and rotor operate as a downhole motor or pumps fluid in the case where the stator and rotor operate as a downhole pump.

As an example of a downhole motor, a main borehole may in some instances be formed in a substantially vertical orientation relative to a surface of the well, and a lateral borehole may in some instances be formed in a substantially horizontal orientation relative to the surface of the well. However, reference herein to either the main borehole or the lateral borehole is not meant to imply any orientation, and the orientation of each of these boreholes may include portions that are vertical, non-vertical, horizontal, or non-horizontal. Further, the term "uphole" refers a direction that is towards the surface of the well, while the term "downhole" refers a direction that is away from the surface of the well.

Figure 1:
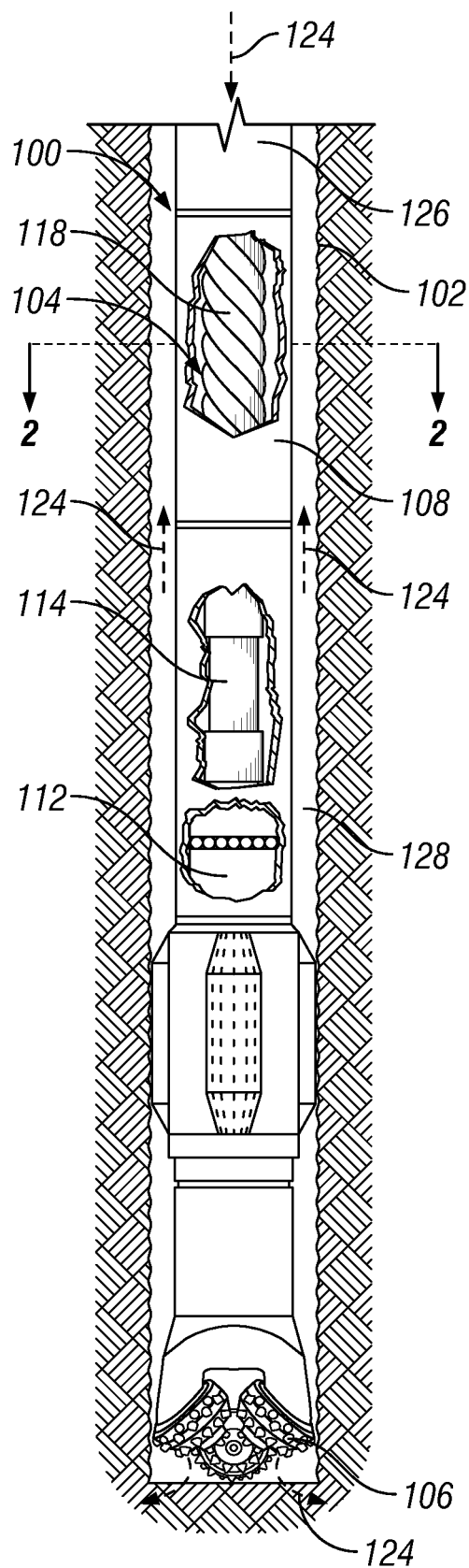
FIG. 1 is a drilling system disposed in a borehole, according to one or more embodiments.
Figure 2:
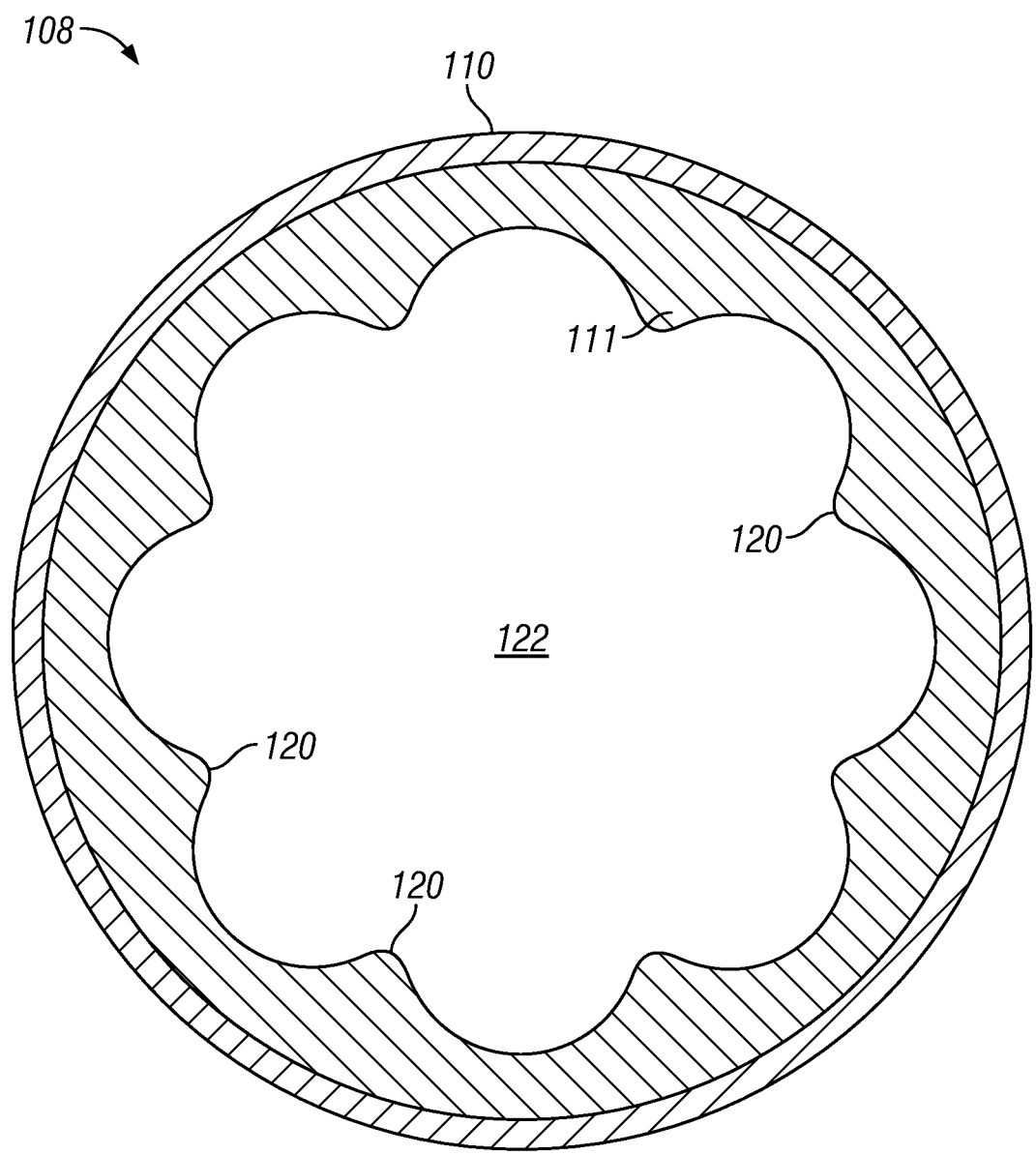
FIG. 2 is a cross section view of an embodiment of a stator and rotor for the drilling system of FIG. 1.
Figure 3:
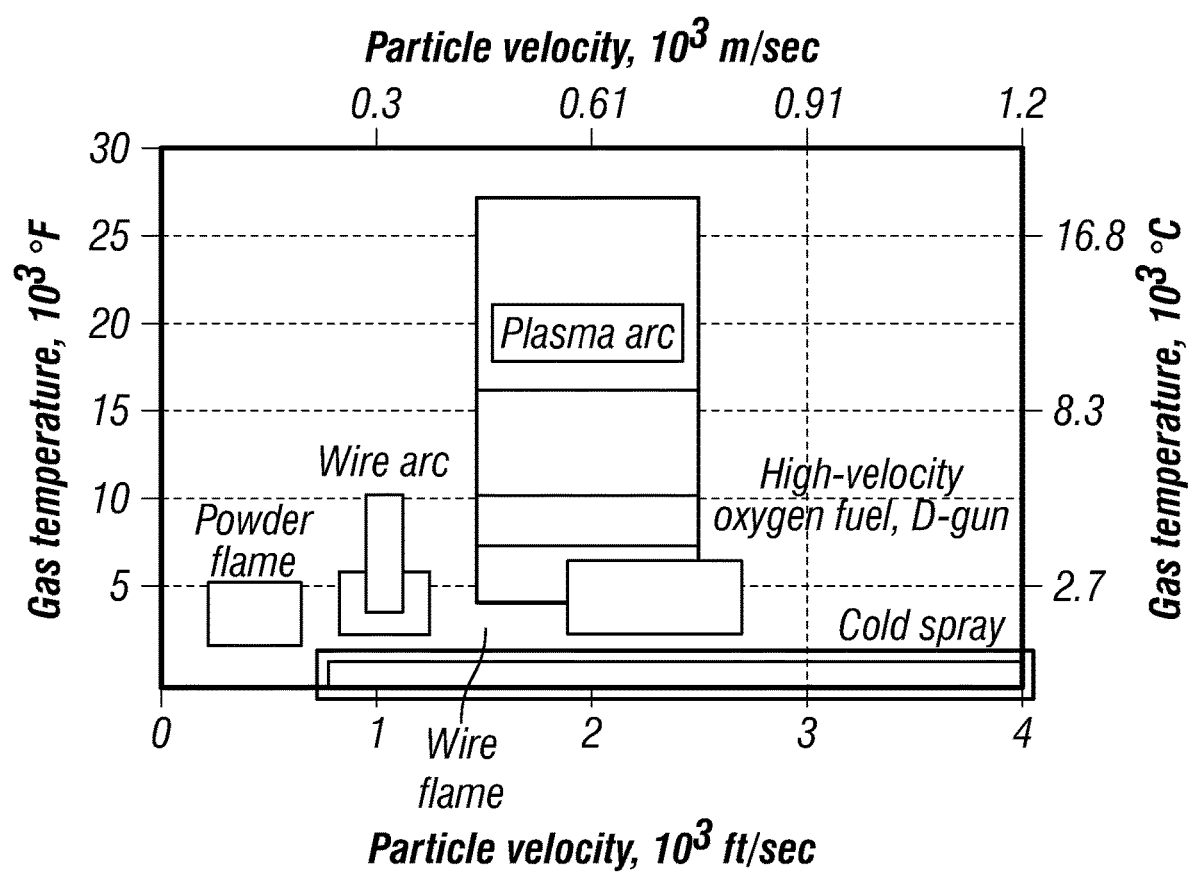
FIG. 3 is a chart illustrating process temperature and particle velocities of various deposition processes.

FIGS. 1 and 2 are a broken side view and a cross section view of a drilling system 100 disposed in a wellbore 102 and that includes a downhole motor 104 connected to a drill bit 106. The downhole motor 104 includes a stator 108 that includes an outer tubular housing 110 and an overlay 111 deposited by cold spray onto an interior of the housing 110 to form overlay lobes 120 on the inside of the housing 110 along a first length of the stator 108. Cold spraying is a coating deposition method where solid powders (e.g., 1 to 50 µm in diameter) are accelerated in a supersonic gas jet to velocities that can be, for example, up to about 1200 m/s. During impact with the substrate, in this case the outer housing 110, the particles undergo plastic deformation and adhere to the surface. The kinetic energy of the particles, supplied by the expansion of the gas, is converted to plastic deformation energy during bonding. As illustrated in the chart in FIG. 3, unlike thermal spraying techniques, e.g., plasma spraying, arc spraying, flame spraying, or high velocity oxygen fuel (HVOF), the powders in cold spraying do not get as hot and are not melted during the spraying process despite having velocities up to 4,000 ft/s (1219 m/s). Any suitable material capable of plastic deformation may be used for the overlay 111, e.g., metals, polymers, ceramics, composite materials, and nanocrystalline powders. In the embodiment shown in FIG. 2, the overlay is a metal, for example, a low alloy steel such as 4140 steel or similar. In addition, the overlay 111 may be the same or a different material than the outer housing 110.

The stator 108 includes multiple (e.g., eight) overlay lobes 120 extending along the stator 108 in a helical configuration and defining a cavity 122. A rotor 118 is rotatable within the stator 108 and includes lobes extending along the rotor 118 in a helical configuration. The stator 108 and rotor 118 can also have more or fewer lobes where the difference between the rotor and stator lobes is one extra stator lobe 120 for the number of rotor lobes. The rotor 118 is operatively positionable in the cavity 122 such that the rotor lobes cooperate with the stator lobes 120 in that applying fluid pressure to the cavity 122 by flowing fluid within the cavity 122 causes the rotor 118 to rotate within the stator 108. For example, referring to FIGS. 1 and 2, pressurized drilling fluid (e.g., drilling mud) 124 can be introduced at an upper end of the stator 108 and forced down through the cavity 122. As a result of the pressurized drilling fluid 124 flowing through the cavity 122, the rotor 118 rotates, which causes the drill bit 106 to rotate and cut away material from the formation and drill the wellbore. From the cavity 122, the drilling fluid 124 is expelled at the lower end and then subsequently exhausted from the drill bit 106. During operation, the friction from the interaction between the rotor 118 and the stator 108 generates (hysteretic) heat. To dissipate the heat, the material used for the overlay 111 may be selected based on the ability to conduct the (hysteretic) heat out to the outer housing 110 to better cool the drilling system 100.

During a drilling operation, the drilling fluid 124 is pumped down the interior of a drill string 126 (shown broken away) attached to downhole motor 104. The drilling fluid 124 enters cavity 122 having a pressure that is a combination of pressure imposed on the drilling fluid by pumps (e.g., pumps at the surface) and the hydrostatic pressure of the above column of drilling fluid 124. The pressurized drilling fluid entering cavity 122, in cooperation with the lobes 120 of the stator 108 and the geometry of the stator 108 and the rotor 118 causes the rotor 118 to turn to allow the drilling fluid 124 to pass through the motor 104, thus rotating the rotor 118 relative to the stator 108. The drilling fluid 124 subsequently exits through ports (e.g., jets) in the drill bit 106 and travels upward through an annulus 128 between the drill string 126 and the wellbore 102 and is received at the surface where it is captured and pumped down the drill string 126 again.

It is appreciated by those skilled in the art in addition to a drilling system that uses a PDP, a downhole assembly using a stator and rotor as described above may also be used as a PCP in a completion system for pumping downhole fluids to the surface. When operating as a PCP, the rotor 118 is driven to rotate within the stator 108, thus forcing fluid within the stator 108 to flow and be pumped uphole to the surface.

As shown in FIG. 1, the stator 108 extends along a length of the drilling system 100 and therefore the overlay 111 extends along a length of the drilling system as well. The shape of the overlay 111 and thus the overlay lobes 120 may be the same along the length of the stator 108. However, the overlay 111 may also include a first length of one shape and a second length with another shape. For example, the thickness of the overlay 111 and thus the thickness of the overlay lobes 120 may change over the length of the stator 108.

Figure 4:
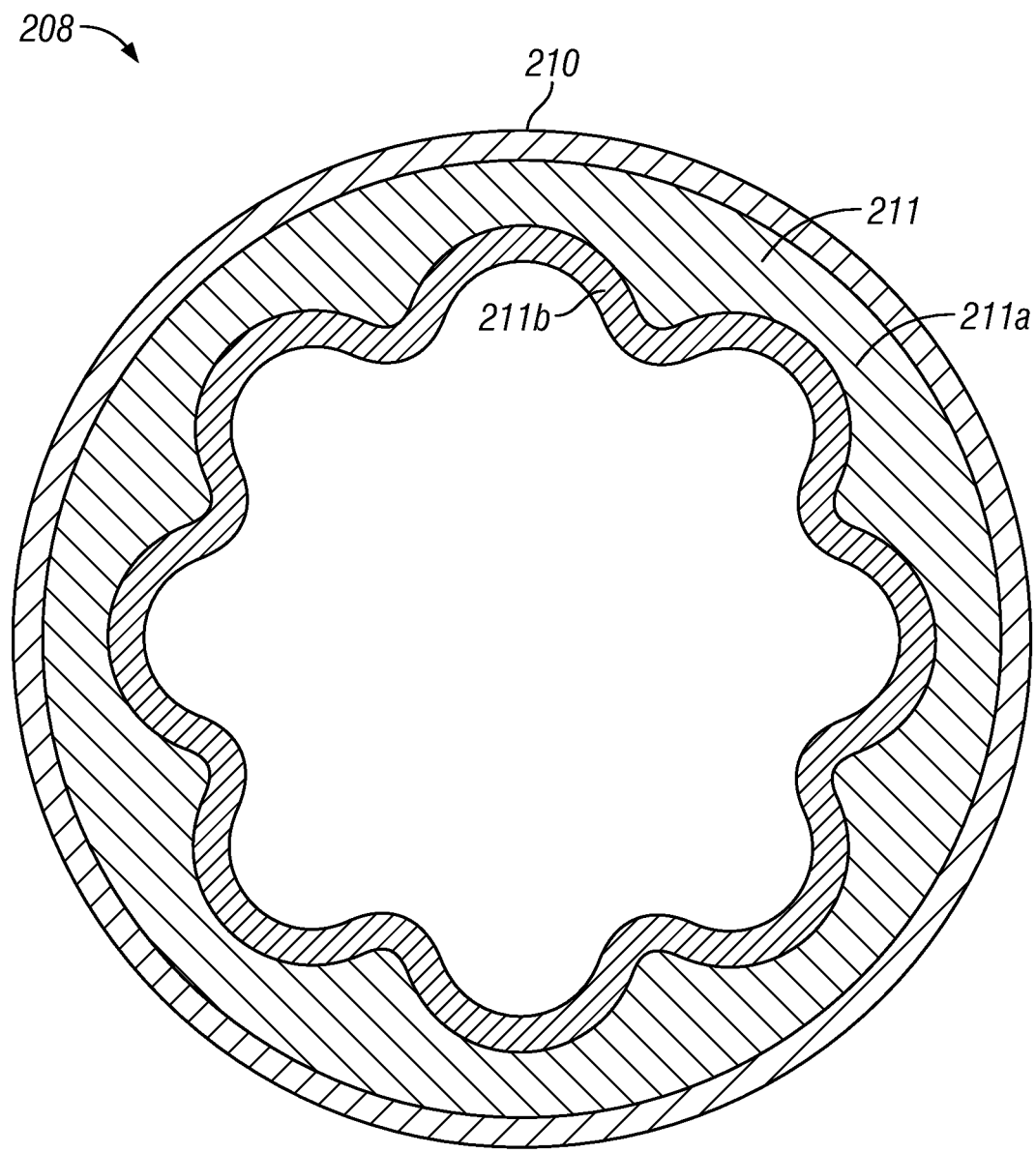
FIG. 4 is a cross section view lengthwise of an embodiment of a stator for the drilling system of FIG. 1.
Figure 5:
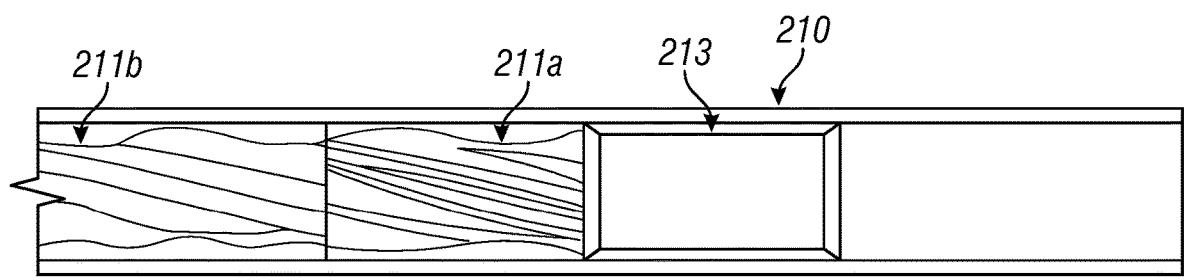
FIG. 5 is a cross section view of another embodiment of a stator and rotor for the drilling system of FIG. 1.

FIGS. 4 and 5 illustrate an alternative stator 208, for use in one or more embodiments. Like the stator 108, the stator 208 includes an outer housing 210 and an overlay 211 deposited by cold spray onto an interior of the housing 210 to form overlay lobes on the inside of the housing along a first length of the stator 208. However, the stator 208 further includes a multi-layer overlay 211 with at least layers 211*a* and 211*b*, both applied by cold spraying. The overlay layer 211*a* may be a similar material to the overlay 111 of FIG. 2. However, the overlay layer 211*a* may also be a heat conducting material. The overlay layer 211*b* may be a relatively softer material than overlay layer 211*a* and may also include a corrosion resistant material. For example, the overlay layer 211*b* may include alloy 625, C276, alloy 925 or similar corrosion resistant from the nickel family or titanium. The corrosion resistant, ductile, and tough overlay layer 211*b* eliminates potential contact of the overlay lobes from the overlay layer 211*a* with corrosive drilling fluids, thus reducing the need for repair. To support rotation of the rotor, the stator 208 may optionally include a structural feature, e.g., a section of reduced inner diameter, a circular ring, half spheres, helical lobes, or other suitable structure. An example structure may include a section of reduced diameter 213 shown in FIG. 5.

Alternatively, the overlay layer 211*b* may include a WC based a $Cr_2C_3$ based composite material with an alloyed mixture or Ni—Cr—B alloy. In addition to the composite material, the overlay layer 211*b* may be further reinforced using a co-deposited solid lubricant such as tungsten disulfide, graphite, boron nitride, or similar lubricating materials to prevent wear at the rotor/stator interface. Additionally, the outermost overlay layer 211*a* need not include overlay lobes. Instead, the overlay lobes may be formed only with the innermost overlay layer 211*b*.

Figure 6:
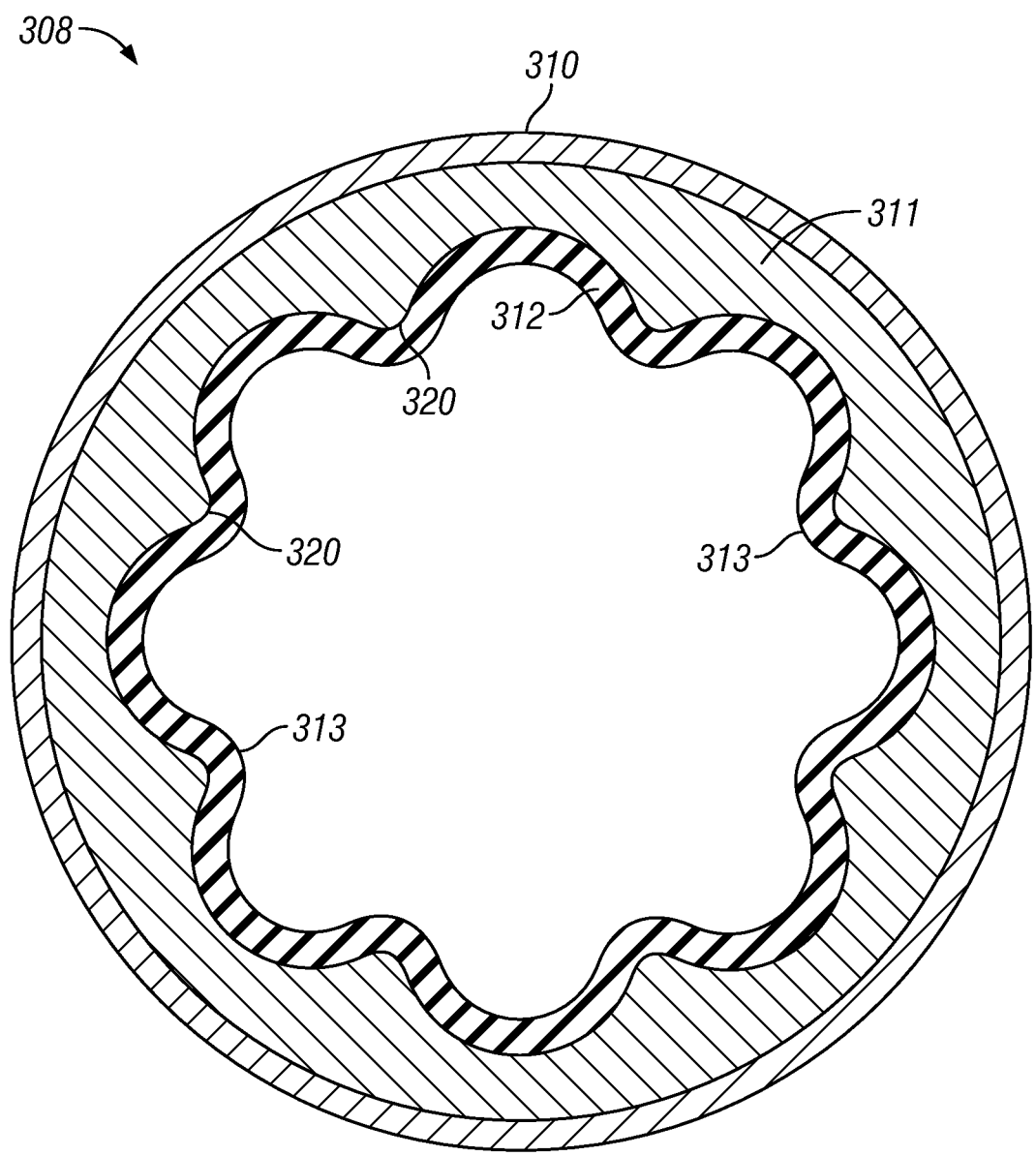
FIG. 6 is a cross section view of another embodiment of a stator and rotor for the drilling system of FIG. 1.

FIG. 6 illustrates an alternative stator 308, for use in one or more embodiments. Like the stator 108, the stator 308 includes an outer housing 310 and an overlay 311 deposited by cold spray onto an interior of the housing 310 to form overlay lobes 320 on the inside of the housing along a first length of the stator 308. However, the stator 308 further includes an elastomer 312 bonded to the overlay 311 using an appropriate adhesive system. The elastomer 312 may be any suitable downhole elastomer, such as for example nitrile rubber or acrylonitrile butadiene rubber (NBR), nickel-based butadiene rubber (NIBR), or hydrogenated acrylonitrile butadiene rubber (HNBR). As shown, the elastomer 312 is applied in a layer of consistent thickness around the interior of the overlay 311, thus creating elastomer lobes 313 that match the overlay lobes 320. Like the shape of the overlay 311 potentially changing along the length of the stator 308, the shape of the elastomer 312 may likewise change over the length of the stator 308 and need not be a consistent thickness around the inside of the overlay 311 along the entire length of the stator 308.

In addition, like the overlay 211 in stator 208 of FIG. 5, the overlay 311 of the stator 308 may also be multi-layer. For example, one innermost overlay layer may a relatively softer material than other overlay layers and may also include a corrosion resistant material. The softer overlay layer would be what the elastomer 312 is applied to and the relative softness of the overlay layer contributing to the ability of the adhesive system to bond with the elastomer 312. Additionally, the overlay 311 may include a layer of a WC based a $Cr_2C_3$ based composite material with an alloyed mixture or Ni—Cr—B alloy. In addition to the composite material, the layer of the overlay 311 may be further reinforced using a co-deposited heat conducting material such as copper, graphene, or carbon nanotube to aid in reducing thermal hysteresis damage of the elastomer 312.

Figure 7:
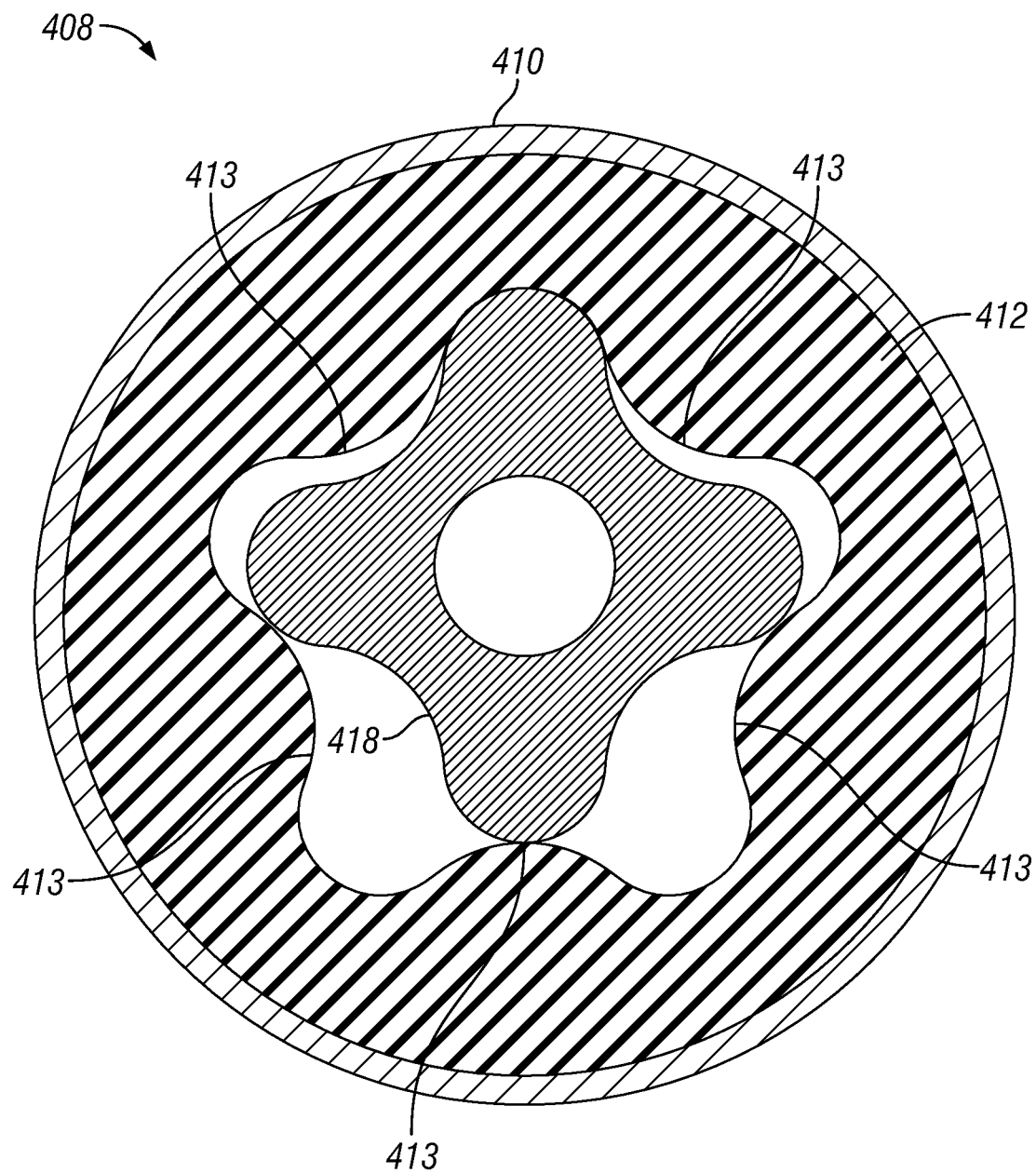
FIG. 7 is a cross section view of another embodiment of a portion of a stator and rotor for the drilling system of FIG. 1.

FIG. 7 illustrates an alternative second length of a stator 408, for use in one or more embodiments. Like the stators 108, 208, and 308, the stator 408 includes an outer housing 410 and a first section with an overlay deposited by cold spray onto an interior of the housing to form overlay lobes on the inside of the housing along a first length of the stator. However, FIG. 7 shows a second length of the stator 408 that includes no overlay. Instead, the elastomer 412 is bonded directly to the tubular housing 410 along the second length in varying thicknesses around the interior of the housing 410 shaped to form the elastomer lobes 413 that interact with the rotor 418. Thus, the first and second lengths of the stator 408 form a hybrid stator 408 where a first length of the stator 408 includes an overlay applied to the inside of the outer housing 410 and a second length does not.

Figure 8:
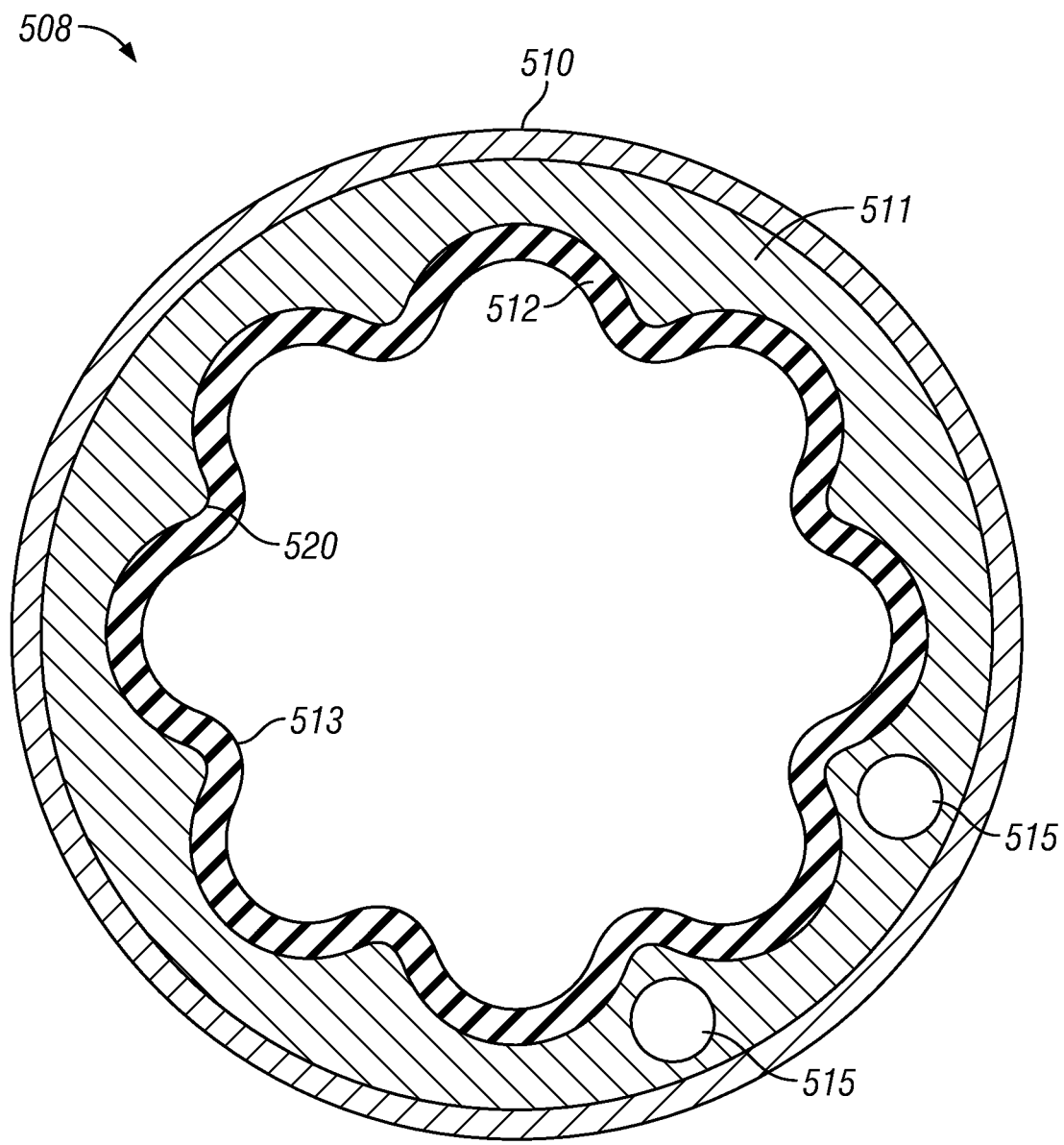
FIG. 8 is a cross section view of another embodiment of a stator and rotor for the drilling system of FIG. 1.

FIG. 8 illustrates an alternative stator 508, for use in one or more embodiments. Like the stator 308, the stator 508 includes an outer housing 510 and an overlay 511 deposited by cold spray onto an interior of the housing 510 to form overlay lobes 520 on the inside of the housing along a first length of the stator 508. The stator 508 also includes an elastomer 512 bonded to the overlay 511 using an appropriate adhesive system to form elastomer lobes 513. However, the stator 508 further includes cables 515 embedded in the overlay 511. Although only two cables 515 are shown, any number of cables 515 may be embedded. The cables 515 may be embedded in the overlay 511 during the cold spray process by either cold spraying around a conduit (not shown) housing the cables or directly onto an insulated cable or bundle of cables until the cables 515 are completely embedded in the overlay 511. The cables 515 are made of a conductive material and may be any suitable conductive material for conducting an electric current or signal through the stator 508. With the cables 515, a communication signal, sensor signal, power, or a combination of the three may be sent through the stator 508 to components above and below the stator 508.

Figure 9:
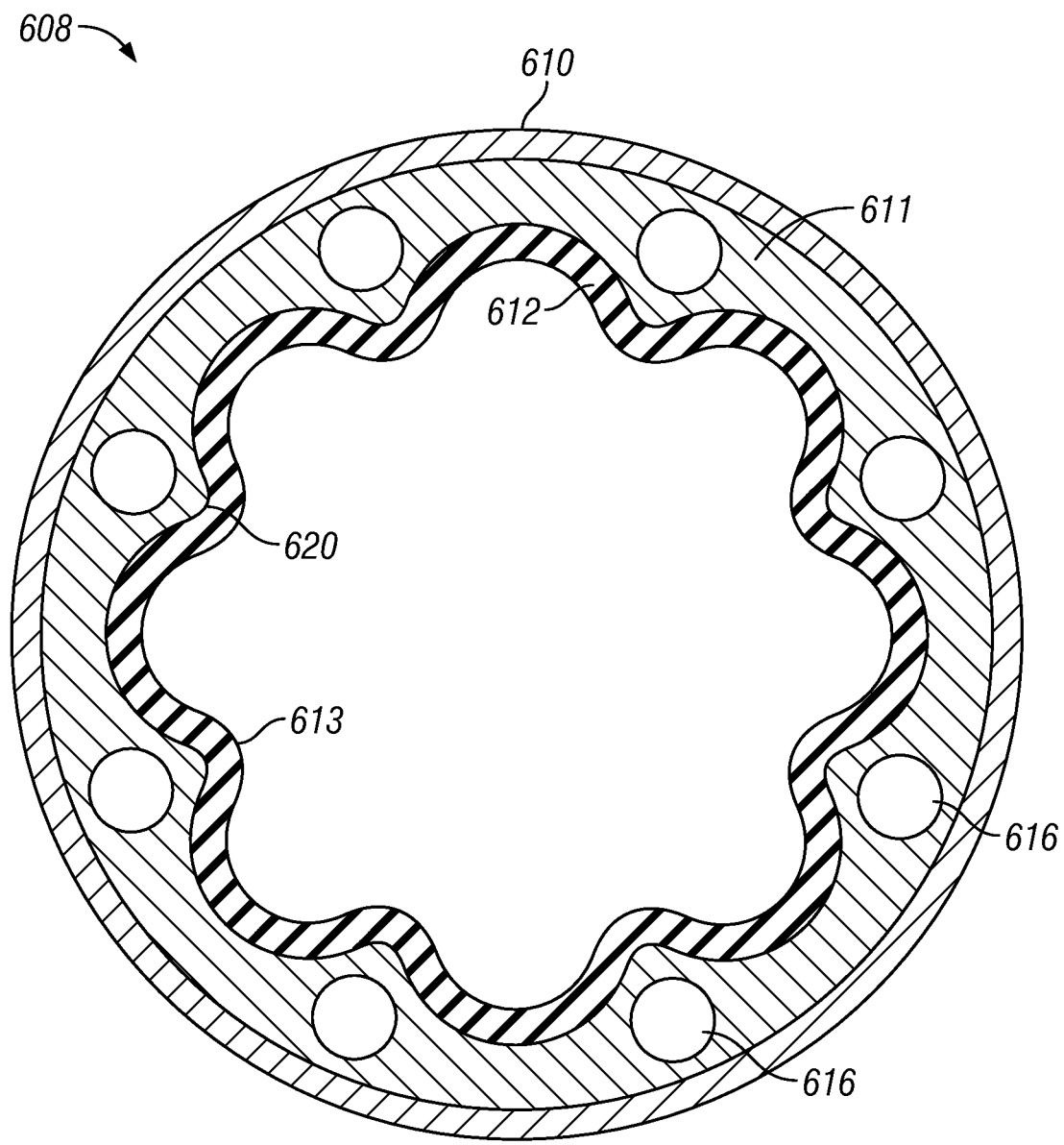
FIG. 9 is a cross section view of another embodiment of a stator and rotor for the drilling system of FIG. 1.

FIG. 9 illustrates an alternative stator 608, for use in one or more embodiments. Like the stator 308, the stator 608 includes an outer housing 610 and an overlay 611 deposited by cold spray onto an interior of the housing 610 to form overlay lobes 620 on the inside of the housing along a first length of the stator 608. The stator 608 also includes an elastomer 612 bonded to the overlay 611 using an appropriate adhesive system to form elastomer lobes 613. However, the stator 608 further includes cooling channels 616 embedded in the overlay 611. Although only eight cooling channels 616 are shown, any number of cooling channels 616 may be embedded. The cooling channels 616 may be embedded in the overlay 611 during the cold spray process by cold spraying around a conduit that forms the cooling channel 616 until the cooling channels 616 are completely embedded in the overlay 611. The cooling channels 616 are hollow and allow the flow of a cooling fluid through the stator 608. In addition to reducing the amount of material needed to form the overlay 511, the cooling channels 616 receiving flow of a cooling fluid helps absorb and dissipate the (hysteretic) heat generated by the friction from the interaction between the rotor and the stator 608, thus reducing thermal hysteresis damage of the elastomer 612.

Figure 10:
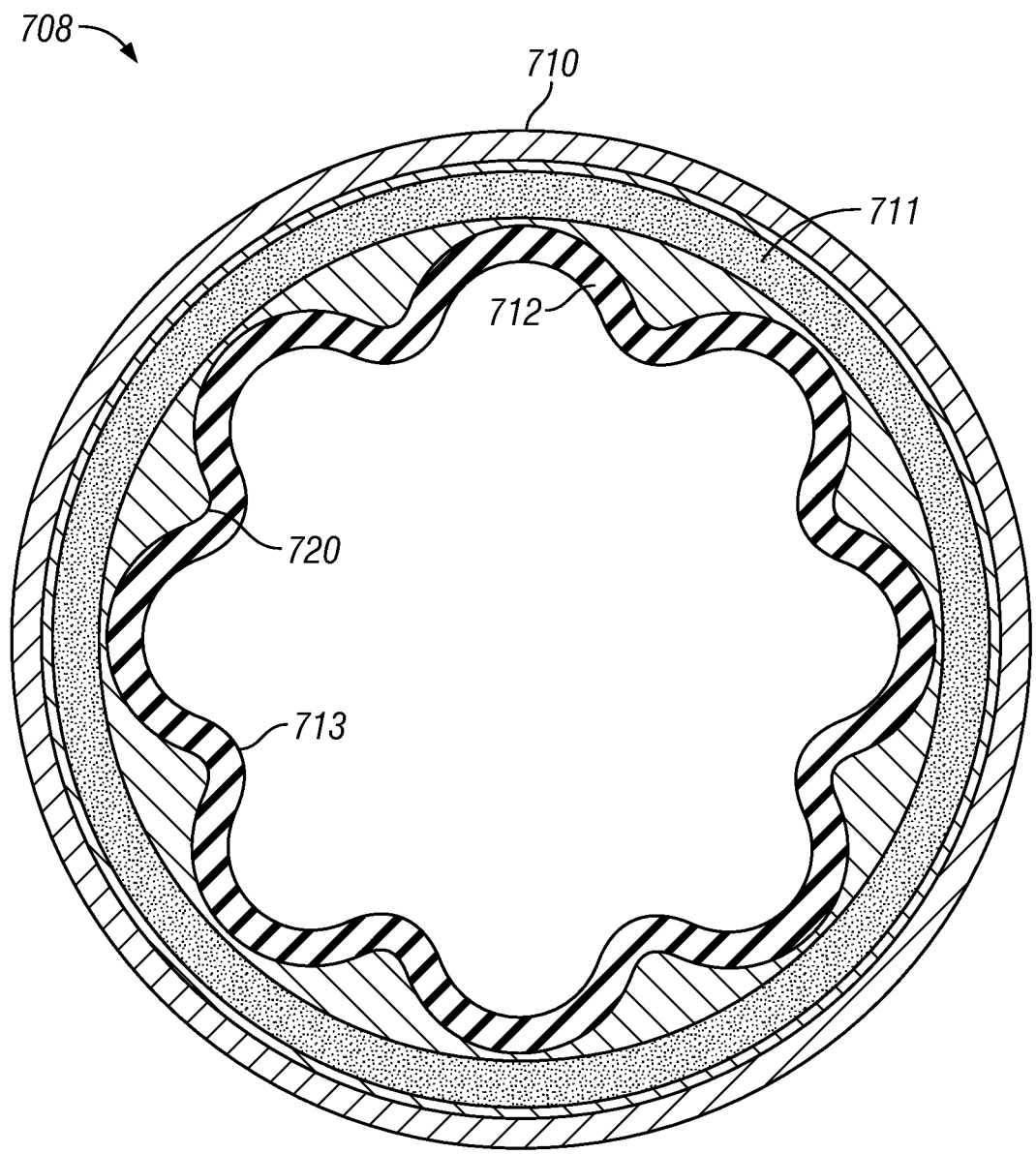
FIG. 10 is a cross section view of another embodiment of a stator and rotor for the drilling system of FIG. 1.

FIG. 10 illustrates an alternative stator 708, for use in one or more embodiments. Like the stator 308, the stator 708 includes an outer housing 710 and an overlay 711 deposited by cold spray onto an interior of the housing 710 to form overlay lobes 720 on the inside of the housing along a first length of the stator 708. The stator 708 also includes an elastomer 712 bonded to the overlay 711 using an appropriate adhesive system to form elastomer lobes 713. However, the stator 708 further includes a porous structure 717 embedded within the overlay 711. The porous structure 717 may be a lattice structure, a sponge-like structure, or other porous structure. For example, the porous structure 717 may include but are not limited to 4140 and similar alloy steels, stainless and nickel based alloys such as 17-4 PH, 316L, nickel alloys 625, 718, aluminum alloys such as 2024 and 6061 as well as composite materials like WC—Co, WC—Ni, CR2C3, Ni—Cr—B. The selection of the material is based on many factors including, cost, corrosion resistance, erosion resistance and depends on the detailed design/material requirements of the lattice structure or metal foam including required stiffness/flexibility and bond to the housing and adhesive/elastomer system. In addition to reducing the amount of material needed to form the overlay 611, the porous structure 717 may allow fluid flow along the first length of the stator 608 of a cooling fluid that helps absorb and dissipate the (hysteretic) heat generated by the friction from the interaction between the rotor and the stator 708, thus reducing thermal hysteresis damage of the elastomer 712. Additionally, the porous structure 717 can be designed support the elastomer 712 compression, i.e., flex, in response to the compression of the elastomer 712 during use. The porous structure 717 may also support the rotor during use while providing a degree of flexibility to enable better sealing of the rotor and adjustments to address dimensional changes due to variations in operating temperature.

Examples of the Above Embodiments Include

Example 1. A downhole motor or pump assembly that comprises: a stator comprising a tubular housing and an overlay deposited by cold spray onto an interior of the housing to form overlay lobes along a first length of the stator; and a rotor rotatable within the stator.

Example 2. The assembly of Example 1, wherein the shape of the metallic overlay changes over the length of the stator.

Example 3. The assembly of Example 1, wherein the metallic overlay comprises a first layer comprising a first material and a second layer comprising a second material different than the first material.

Example 4. The assembly of Example 1, wherein the metallic overlay comprises a layer comprising a mixture of a composite material and a solid lubricant.

Example 5. The assembly of Example 1, wherein the metallic overlay comprises a layer comprising a mixture of a composite material and a heat conducting material.

Example 6. The assembly of Example 1, wherein the stator further comprises an elastomer bonded to the overlay lobes.

Example 7. The assembly of Example 6, further comprising at least one of one or more conducting cables or one or more cooling channels embedded in the metallic overlay.

Example 8. The assembly of Example 6, further comprising a porous structure within the metallic overlay allowing fluid flow along the first length of the stator.

Example 9. The assembly of Example 6, wherein the thickness of the elastomer changes over the first length of the stator such that the shape of the elastomer lobes changes over the first length of the stator.

Example 10. The assembly of Example 1, comprising no metallic overlay along a second length of the stator and further comprising an elastomer bonded directly to the tubular housing along the second length in varying thicknesses around the interior of the housing and shaped to form the elastomer lobes.

Example 11. The assembly of Example 1, wherein the assembly is connected to and operable as a motor to power the rotation of a drill bit.

Example 12. A method of performing a downhole operation in a borehole, comprising operating a downhole motor or downhole pump assembly, the motor or pump comprising: a stator comprising a tubular housing and an overlay deposited by cold spray onto an interior of the housing to form overlay lobes along a first length of the stator; and a rotor rotatable within the stator.

Example 13. The method of Example 12, wherein the shape of the metallic overlay changes over the length of the stator.

Example 14. The method of Example 12, wherein the metallic overlay comprises a first layer comprising a first material and a second layer comprising a second material different than the first material.

Example 15. The method of Example 12, wherein the metallic overlay comprises a layer comprising a mixture of a composite material and a solid lubricant.

Example 16. The method of Example 12, wherein the metallic overlay comprises a layer comprising a mixture of a composite material and a heat conducting material.

Example 17. The method of Example 12, wherein the stator further comprises an elastomer bonded to the overlay lobes in an even thickness at any point along the first length of the stator to form elastomer lobes.

Example 18. The method of Example 17, further comprising at least one of one or more conducting cables or one or more cooling channels embedded in the metallic overlay.

Example 19. The method of Example 17, further comprising a porous structure within the metallic overlay allowing fluid flow along the first length of the stator.

Example 20. The method of Example 17, wherein the thickness of the elastomer changes over the first length of the stator such that the shape of the elastomer lobes changes over the first length of the stator.

Example 21. The method of Example 12, comprising no metallic overlay along a second length of the stator and further comprising an elastomer bonded directly to the tubular housing along the second length in varying thicknesses around the interior of the housing and shaped to form the elastomer lobes.

Example 22. The method of Example 12, wherein the downhole operation comprises drilling a wellbore by pumping fluid into the assembly to rotate the rotor to power the rotation of a drill bit.

Certain terms are used throughout the description and claims to refer to particular features or components. As one skilled in the art will appreciate, different persons may refer to the same feature or component by different names. This document does not intend to distinguish between components or features that differ in name but not function.

While compositions and methods are described herein in terms of "comprising" various components or steps, the compositions and methods can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A downhole motor or pump assembly, the downhole motor or pump assembly comprising:
    a stator comprising:
        an outer tubular housing comprising a uniform interior surface; and
        a metallic overlay deposited by cold spray onto the interior surface of the housing to form overlay lobes along a first length of the stator; and
    a rotor rotatable within the stator.

2. The assembly of claim 1, wherein the shape of the metallic overlay changes over the length of the stator.

3. The assembly of claim 1, wherein the metallic overlay comprises a first layer comprising a first material and a second layer comprising a second material different than the first material.

4. The assembly of claim 1, wherein the metallic overlay comprises a layer comprising a mixture of a composite material and a solid lubricant.

5. The assembly of claim 1, wherein the metallic overlay comprises a layer comprising a mixture of a composite material and a heat conducting material.

6. The assembly of claim 1, wherein the stator further comprises an elastomer bonded to the overlay lobes.

7. The assembly of claim 6, further comprising at least one of one or more conducting cables or one or more cooling channels embedded in the metallic overlay.

8. The assembly of claim 6, further comprising a porous structure within the metallic overlay allowing fluid flow along the first length of the stator.

9. The assembly of claim 6, wherein the thickness of the elastomer changes over the first length of the stator such that the shape of the elastomer lobes changes over the first length of the stator.

10. The assembly of claim 1, comprising no metallic overlay along a second length of the stator and further comprising an elastomer bonded directly to the tubular housing along the second length in varying thicknesses around the interior of the housing and shaped to form the elastomer lobes.

11. The assembly of claim 1, wherein the assembly is connected to and operable as a motor to power the rotation of a drill bit.

12. A method of performing a downhole operation in a borehole, comprising operating a downhole motor or downhole pump assembly, the motor or pump comprising:
    a stator comprising:
        an outer tubular housing comprising a uniform interior surface; and
        a metallic overlay deposited by cold spray onto the interior surface of the housing to form overlay lobes along a first length of the stator; and
    a rotor rotatable within the stator.

13. The method of claim 12, wherein the shape of the metallic overlay changes over the length of the stator.

14. The method of claim 12, wherein the metallic overlay comprises a first layer comprising a first material and a second layer comprising a second material different than the first material.

15. The method of claim 12, wherein the metallic overlay comprises a layer comprising a mixture of a composite material and a solid lubricant.

16. The method of claim 12, wherein the metallic overlay comprises a layer comprising a mixture of a composite material and a heat conducting material.

17. The method of claim 12, wherein the stator further comprises an elastomer bonded to the overlay lobes in an even thickness at any point along the first length of the stator to form elastomer lobes.

18. The method of claim 17, further comprising at least one of one or more conducting cables or one or more cooling channels embedded in the metallic overlay.

19. The method of claim 17, further comprising a porous structure within the metallic overlay allowing fluid flow along the first length of the stator.

20. The method of claim 17, wherein the thickness of the elastomer changes over the first length of the stator such that the shape of the elastomer lobes changes over the first length of the stator.

21. The method of claim 12, comprising no metallic overlay along a second length of the stator and further comprising an elastomer bonded directly to the tubular housing along the second length in varying thicknesses around the interior of the housing and shaped to form the elastomer lobes.

22. The method of claim 12, wherein the downhole operation comprises drilling a wellbore by pumping fluid into the assembly to rotate the rotor to power the rotation of a drill bit.

* * * * *